US012793341B2

(12) United States Patent
Gigengack et al.

(10) Patent No.: US 12,793,341 B2
(45) Date of Patent: Nov. 10, 2026

(54) METHOD FOR GENERATING A GENERIC 3D REPRESENTATION OF A SURROUNDINGS OF A VEHICLE

(71) Applicant: Robert Bosch GmbH, Stuttgart (DE)

(72) Inventors: Fabian Gigengack, Hemmingen (DE); Simon Boeder, Hannover (DE)

(73) Assignee: ROBERT BOSCH GMBH, Stuttgart (DE)

( * ) Notice: Subject to any disclaimer, the term of this patent is extended or adjusted under 35 U.S.C. 154(b) by 184 days.

(21) Appl. No.: 18/766,036

(22) Filed: Jul. 8, 2024

(65) Prior Publication Data

US 2025/0022226 A1 Jan. 16, 2025

(30) Foreign Application Priority Data

Jul. 10, 2023 (DE) ..................... 10 2023 206 520.7

(51) Int. Cl.
*G06T 17/20* (2006.01)
*G06T 7/521* (2017.01)

(52) U.S. Cl.
CPC .............. *G06T 17/20* (2013.01); *G06T 7/521* (2017.01); *G06T 2207/20081* (2013.01); *G06T 2207/30252* (2013.01)

(58) Field of Classification Search
None
See application file for complete search history.

(56) References Cited

PUBLICATIONS

Wei et al. (SurroundOcc: Multi-Camera 3D Occupancy Prediction for Autonomous Driving, Computer Vision and Pattern Recognition, Mar. 2023) (Year: 2023).*
Caliskan et al. (Multi-View Consistency Loss for Improved Single-Image 3D Reconstruction of Clothed People, Computer Vision and Pattern Recognition, 2020) (Year: 2020).*
Dryanovski, et al.: "Multi-Volume Occupancy Grids: an Efficient Probabilistic 3D Mapping Model for Micro Aerial Vehicles," 2010 IEEE/RSJ International Conference on Intelligent Robots and Systems, IEEE (2010), Japan, pp. 1553-1559.
Guo, et al.: "Efficient Planar Surface-Based 3D Mapping Method for Mobile Robots Using Stereo Vision," IEEE Access, 7 (2019), pp. 73593-73601.

(Continued)

*Primary Examiner* — Kyle Zhai
(74) *Attorney, Agent, or Firm* — NORTON ROSE FULBRIGHT US LLP

(57) ABSTRACT

A method for generating a generic 3D representation of a surroundings of a vehicle. The method includes: generating first image data, which represent the surroundings of the vehicle; extracting at least one image feature from the first image data using a trainable ML model; generating a voxel-based 3D representation for the surroundings of the vehicle using the trainable ML model in that the at least one image feature n the 2D domain is transformed into a corresponding voxel feature in a 3D domain, wherein the generated 3D representation for the at least one voxel feature stores information about the probability with which this 3D domain of this voxel s occupied; training the machine learning model to extract at least one image feature from at least one camera and to determine the occupancy of all 3D voxels.

7 Claims, 2 Drawing Sheets

(56) References Cited

PUBLICATIONS

Li, et al.: "StereoVoxelNet: Real-Time Obstacle Detection Based on Occupancy Voxels from a Stereo Camera Using Deep Neural Networks," 2023 IEEE International Conference on Robotics and Automation (ICRA 2023), pp. 4826-4833.

Morales, et al.: "A Combined Voxel and Particle Filter-Based Approach for Fast Obstacle Detection and Tracking in Automotive Applications," IEEE Transactions on Intelligent Transportation Systems, 18(7), (2017), pp. 1824-1834.

* cited by examiner

METHOD FOR GENERATING A GENERIC 3D REPRESENTATION OF A SURROUNDINGS OF A VEHICLE

FIELD

The present invention relates to a method for generating a generic 3D representation of a surroundings of a vehicle.

BACKGROUND INFORMATION

Today's conventional methods for 2D or 3D object recognition generally use so-called machine learning models (ML models), which are trained on the basis of known objects, such as vehicles, pedestrians or traffic signs, identified in the existing data. Such methods require a large amount of existing, annotated image data in order to train the neural network to a corresponding quality.

However, this approach is inadequate for the application area of autonomous driving. This is because an autonomously driving vehicle must be able to recognize any object with which it could potentially collide, within a 360-degree radius surrounding the vehicle. Such tasks are solved by means of so-called generic object detection. Conventional solutions for generic object detection have so far often pursued the approach of obtaining information about the depth and degree of movement for objects in a surroundings of the vehicle by fusing stereo and temporal information. However, this approach is only applicable to a single image or to image pairs in a 2D domain and often implies the application of traditional computer-vision-based techniques, which have very low performance in comparison to techniques based on machine learning models.

It is an object of the present invention to provide a solution by means of which generic 3D object detection for a surroundings of a vehicle can be implemented efficiently and reliably.

SUMMARY

This object may be achieved by a method for generating a generic 3D representation of a surroundings of a vehicle.

According to a first aspect, the present invention relates to a method for generating a generic 3D representation of a surroundings of a vehicle. According to an example embodiment of the present invention, the method includes the following steps:

In a first step, first image data, which represent the surroundings of the vehicle, are generated on the basis of at least one data source.

In a second step, at least one image feature is extracted from the first image data by means of a trainable M model.

In a third step, a generic representation, which can be designed as a voxel-based 3D representation, is generated for the surroundings of the vehicle by means of the trainable ML model in that the at least one image feature in the 2D domain is transformed into a corresponding voxel feature in a 3D domain, wherein the generated 3D representation for the at least one voxel feature stores information about the probability with which this 3D domain of this voxel is occupied.

In a fourth step, a machine learning (ML) model is trained to extract at least one image feature from at least one camera (alternatively: per pixel per camera) and to determine the occupancy of all 3D voxels by means of the following steps:

In a fifth step, the information about a 3D position of the at least one voxel feature in the generated 3D representation is projected into a first camera and into at least a second camera of the vehicle.

In a sixth step, a deviation between the first camera and the second camera is ascertained, wherein the deviation specifies whether the two cameras see the same corresponding image point from the first image data for the projected and at least one voxel feature.

In a seventh step, at least one parameter of the ML model is adjusted in order to minimize the ascertained deviation and thus improve the generated 3D representation.

A feature of the present invention is that the use of a machine learning (ML) model generates a 3D representation of a scene or a surroundings of a vehicle that makes 360-degree-based generic object recognition that is usable for a variety of applications possible.

Another aspect of the present invention is that the provided deep learning model predicts or determines so-called occupancies of voxels in a 3D grid by exploiting spatial and/or temporal effects of the recording image recording devices, such as cameras.

In this way, the ML model can perform generic object detection autonomously while being able to provide a rich 3D representation of a surroundings, in comparison to 2D representations of a surroundings, for a plurality of cameras.

A further aspect of the present invention is that, when projecting a voxel in three-dimensional space into at least two neighboring cameras, a measurement error, such as a photometric error, can be calculated. This photometric error is small if the voxel in question is occupied, since the two cameras have a similar image content at the positions in the image to which the 3D voxel is projected in each case.

An unoccupied voxel would have a higher photometric error since the voxel is not located at a correspondingly correct depth of the corresponding pixel in the projected image. This photometric error can be aggregated or consolidated across all used camera pairs that neighbor one another spatially or temporally. The error can in this case be minimized via optimization methods in order to train the ML model so that better 3D representations can be generated.

According to an example embodiment of the present invention, on the basis of this knowledge, a generic 3D object representation of the surroundings of a vehicle can be generated in that a 3D voxel grid in which each voxel is assigned an occupancy, which provides information about whether the voxel is occupied by an object or not, is generated in the surroundings of the vehicle. This makes it possible to generate representations of any 3D shapes or 3D geometries of objects in the surroundings of a vehicle, which objects can be recognized, regardless of their relevant class affiliation, exclusively via the parameter of the occupancy of the relevant voxel.

The present invention advantageously combines data efficiency through so-called self-supervision with a 3D object representation in a surroundings of a vehicle by using an occupancy network (occupancy grid).

The present invention may achieve the following advantages:

- Generic object detection instead of class-specific object detection from labeled training data.
- Efficient and autonomous training of the ML model.
- The ML model can be supplied with new data at any time without the need to explicitly label the collected data beforehand.
- The ML model can be variably scaled to different applications and areas of use (e.g., for autonomous driving of technical devices or vehicles, surroundings observations, etc.), e.g., by varying the number of cameras used.

Better prediction results of the ML model.

Diverse and application-dependent use of sensors to generate data for generating the 3D object representation, such as radar sensors, lidar sensors, ultrasonic sensors, movement sensors and/or thermal sensors.

The ML model is easier to explain since the generated 3D representation of a surroundings can be understood and evaluated by people.

With the present invention and the generated 3D representation of a surroundings, any object with any geometry in the surroundings of a vehicle can be detected in order to generate corresponding trajectories for vehicles in this way.

One possible example embodiment of the method of the present invention provides that the ML model is trained with additional training data from a lidar data source or that additional training data are generated from a lidar data source. Lidar data can be used to create a rough estimate of the actual occupancy of the voxels in order to facilitate the training process of the ML model. The data from the lidar data source are converted into a voxel-based representation, e.g., voxel grids, which are then used as training data. This achieves the advantage that the ML model can be trained more simply and better so that an exact 3D object representation of the surroundings of the vehicle can be generated efficiently.

One possible example embodiment of the method of the present invention provides that the photometric error is generated by the first camera and the at least second camera in the vehicle each recording an image at an identical point in time t1. This achieves the advantage that an exact 3D object representation of the surroundings of the vehicle can be generated efficiently.

One possible example embodiment of the method of the present invention provides that the photometric error is generated by the first camera and the at least second camera in the vehicle being designed as a common camera, wherein the common camera is designed to record an image at two different points in time t1 and t2. This achieves the advantage that an improved 3D object representation of the surroundings of the vehicle can be generated efficiently.

The photometric error can thus be generated by spatially neighboring cameras as well as by temporally neighboring cameras. This considerably increases the total overlap region of the neighboring cameras, making it possible to determine the photometric error more accurately. The overlap of the region that spatially neighboring cameras see in common is often very small; adding temporal neighbors increases this region significantly (see FIG. 2).

A possible example embodiment of the method of the present invention provides that the at least one voxel feature is extended by an aggregation of at least one further voxel feature from at least one previous point in time. This achieves the advantage that an improved 3D object representation of the surroundings of the vehicle can be generated since the ML model receives additional temporal information.

According to a second aspect, the present invention relates to a computer program containing machine-readable instructions which, when executed on one or more computers and/or compute instances, cause the computer(s) or compute instance(s) to perform the method according to the present invention.

According to a third aspect, the present invention relates to a machine-readable data carrier and/or download product comprising the computer program of the present invention.

According to a fourth aspect, the present invention relates to one or more computers and/or compute instances with the computer program and/or with the machine-readable data carrier and/or the download product.

Further measures improving the present invention are explained in more detail below, together with the description of the preferred exemplary embodiments of the present invention, with reference to figures.

DETAILED DESCRIPTION OF EXAMPLE EMBODIMENTS

Figure 1:
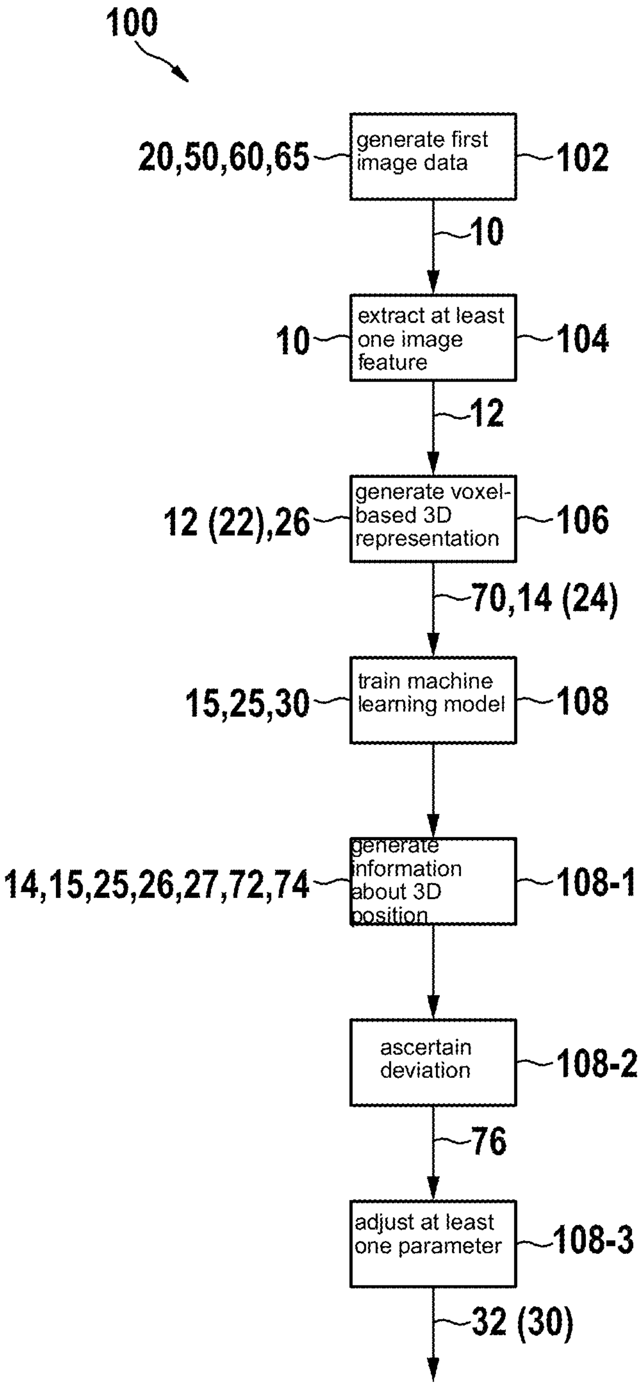
FIG. 1 is a schematic flow diagram of the method 100 for generating a generic 3D representation of a surroundings 50 of a vehicle 60.

FIG. 1 is a schematic flow diagram of the method 100 for generating a generic 3D representation of a surroundings 50 of a vehicle 60.

In step 102, first image data 10, which represent the surroundings 50 of the vehicle 60, are generated on the basis of at least one data source 65.

Optionally, the first image data 10 may be generated from any data source that can be based on an application of different sensor types.

In step 104, at least one image feature 12 is extracted 104 from the first image data 10.

In step 106, a voxel-based 3D representation 70 is generated for the surroundings 50 of the vehicle 60 in that the at least one image feature 12 in the 2D domain 22 is transformed into a corresponding voxel feature 14 in a 3D domain 24, wherein the generated 3D representation 70 for the at least one voxel feature 14 stores information 26 about the probability with which this 3D domain 24 of this voxel feature 14 is occupied.

In step 108, a machine learning (ML) model 30 is trained to transform at least one 2D image point 25 into at least one voxel feature 15 having the following steps:

In step 108-1, the information 26 about a 3D position 27 of the at least one voxel feature 14 in the generated 3D representation 70 is projected into a first camera 72 and into at least a second camera 74 of the vehicle 60.

The photometric error can be calculated by the first camera 72 and the at least second camera 74 in the vehicle 60 each recording an image at an identical point in time t1 (=spatial neighbors).

Alternatively or additionally, the photometric error may be calculated by the first camera 72 and the at least second camera 74 in the vehicle 60 being designed as a common camera, wherein the common camera is designed to record an image at two different points in time t1 and t2 (=temporal neighbors).

In step 108-2, a deviation 76 between the first camera 72 and the second camera 74 is ascertained, wherein the deviation 76 specifies whether the two cameras 72, 74 see the same corresponding image point 25 from the first image data 10 for the projected and at least one voxel feature 14.

In step 108-3, at least one parameter 32 of the ML model 30 is adjusted in order to minimize the ascertained deviation 76 and thus improve the generated 3D representation 70.

Optionally, the at least one voxel feature 14, 15 is extended by an aggregation, for example by adding or averaging, of at least one further voxel feature 16 from at least one previous point in time.

Optionally, additional training data may be generated from a lidar data source in order to train the ML model 30.

Figure 2:
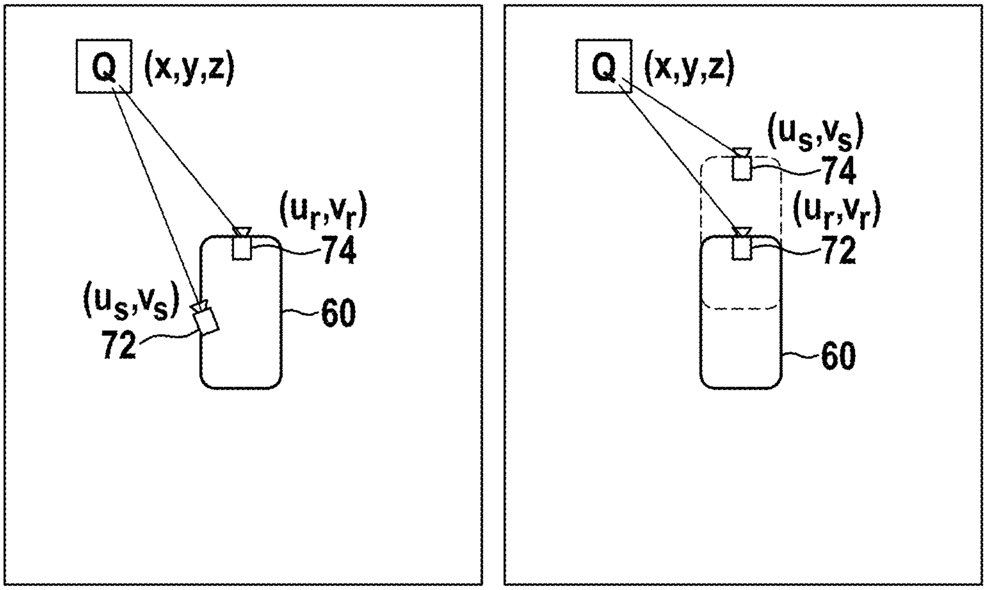
FIG. 2 is a schematic representation of a detection system for performing the method 100 according to an example embodiment of the present invention.

FIG. 2 is a schematic representation of the step 108-1, by which an ML model 30 is trained to transform the first image data 10 into a 3D representation 70.

In the left-hand figure "Spatial neighbors," the two cameras 72, 74 are arranged to be spatially spaced apart from one another and each record an image of the 3D point Q (x, y, z) at an identical point in time.

In the right-hand figure "Temporal neighbors," the two cameras 72, 74 are not arranged to be spatially spaced apart from one another and can be designed as a single or common camera. This common camera then in each case records an image at a first point in time t and at a subsequent point in time t+1.

The photometric error produced by each camera pair for the left-hand and right-hand figures is then calculated for each voxel that is recorded by the two cameras 72, 74, in a 3D grid.

Figure 3:
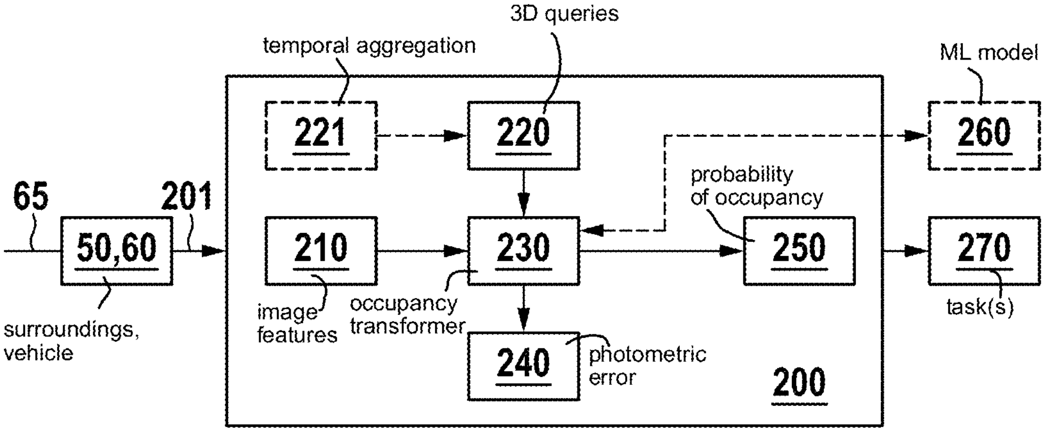
FIG. 3 is a schematic representation of a signal flow plan for performing the method 100 according to an example embodiment of the present invention.

FIG. 3 is a schematic representation of a signal flow plan for performing the method 100 according to an embodiment of the present invention.

FIG. 3 furthermore shows an occupancy network 200 for generating a 3D occupancy output 250.

The conventional occupancy networks were initially used for a 3D representation of individual objects. Modeling entire scenes or a surroundings of a vehicle by using occupancy networks is also conventional in the related art. However, for this purpose, large amounts of three-dimensional training data have previously had to be generated and used in order to train such networks. With the present invention, these large amounts of training data for training an occupancy network become unnecessary, since only image data are sufficient to train the model. This is made possible by ascertaining the photometric error that is produced by projecting voxels into different cameras on a vehicle 60 (see FIG. 2).

The proposed model is supplied with input image data, as input 201, from preferably a plurality of cameras, which input image data are or were recorded at a defined point in time. The occupancy network first extracts corresponding image features 210 therefrom.

Subsequently, the 3D positions of all 3D queries 220 are geometrically projected into the cameras 72, 74 (see FIG. 2), where these learned 3D queries 220 interact with the image features 210 by means of the occupancy transformer 230. The resulting and generated weighted values are then stored in the 3D voxel grid and represent a probability 250 of occupancy for each voxel. The model provides information about a probability with which a voxel in question is occupied in the defined 3D grid, as output 250 of FIG. 3.

On the basis of the input data 201, the surroundings 50 around the vehicle 60 is thus modeled by means of a 3D voxel grid. Each voxel in this 3D voxel grid contains the information as to whether this voxel is occupied by a real object or not.

At the same time, a photometric error 240 of the individual voxels seen by the cameras 72, 74 is calculated by comparing the original image content of the corresponding image pixel for the 3D voxel position of the voxel. The model parameters of the ML network are trained by a loss function, e.g., L2 loss, between occupancy prediction and photometric error by means of a suitable optimization method, e.g., gradient descent.

On the basis of input data 201, which originate from a data source 65 of a vehicle 60 that senses the surroundings 50 thereof, a feature extraction 210 takes place first, the result of which is supplied to an occupancy transformer 230. The output thereof is supplied to a photometric error module 240 in order to calculate a photometric error for each generated voxel, as described in detail above. Since these errors are located in the same 3D grid as the learned output of the model, the predicted occupancy or the predicted occupancy state can be compared directly to the relevant photometric error. A low photometric error corresponds to a high degree of probability of occupancy of a voxel.

With the ML model trained in this way, the generated predictions for occupancy states of the individual voxels can be used for a variety of different tasks (see module 270 of FIG. 3), in particular for generic 3D object detection.

In order to increase the accuracy of the trained ML model, the following steps may optionally be performed (see FIG. 3):

- By introducing a temporal aggregation 221 of the predicted occupancy states (occupancy predictions), earlier points in time can be taken into account and moving objects can be recognized and detected over a defined time progression.
- Further sensor data, for example from lidar point clouds, can be easily integrated in order to provide greater stability to a supervision of the ML model (see module 260 in FIG. 3).

The invention claimed is:

1. A method for generating a generic three-dimensional (3D) representation of a surroundings of a vehicle, the method comprising the following steps:

generating first image data, which represent the surroundings of the vehicle, based on at least one data source;

extracting at least one image feature from the first image data using a trainable machine learning (ML) model;

generating a voxel-based 3D representation for the surroundings of the vehicle using the trainable ML model in that the at least one image feature in a two-dimensional (2D) domain is transformed into a corresponding voxel feature in a 3D domain, wherein the generated 3D representation for the at least one voxel feature stores information about a probability with which the 3D domain of the voxel feature is occupied; and training the ML model to extract at least one image feature from at least one camera and to determine an occupancy of all 3D voxels using the following steps:

projecting information about a 3D position of the at least one voxel feature in the generated 3D representation into a first camera of the vehicle and into at least one second camera of the vehicle, ascertaining a deviation between the first camera and the second camera, wherein the deviation specifies whether the first and second cameras see a same corresponding image point from the first image data for the projected and at least one voxel feature; and adjusting at least one parameter of the ML model to minimize the ascertained deviation and thus improve the generated 3D representation.

2. The method according to claim 1, wherein the ML model is trained with additional training data from a lidar data source.

3. The method according to claim 1, wherein a photometric error is calculated by the first camera and the at least second camera in the vehicle each recording an image at an identical point in time.

4. The method according to claim 1, wherein a photometric error is calculated by the first camera and the at least second camera in the vehicle being configured as a common camera, wherein the common camera is configured to record an image at two different points in time.

5. The method according to claim 1, wherein the at least one voxel feature is extended by an aggregation of at least one further voxel feature from at least one previous point in time.

6. A non-transitory machine-readable data carrier on which is stored a computer program including machine-readable instructions for generating a generic three-dimensional (3D) representation of a surroundings of a vehicle, the instructions, when executed by one or more computers and/or compute instances, causing the one or more computers and/or compute instances to perform the following steps:

generating first image data, which represent the surroundings of the vehicle, based on at least one data source;

extracting at least one image feature from the first image data using a trainable machine learning (ML) model;

generating a voxel-based 3D representation for the surroundings of the vehicle using the trainable ML model in that the at least one image feature in a two-dimensional (2D) domain is transformed into a corresponding voxel feature in a 3D domain, wherein the generated 3D representation for the at least one voxel feature stores information about a probability with which the 3D domain of the voxel feature is occupied; and training the ML model to extract at least one image feature from at least one camera and to determine an occupancy of all 3D voxels using the following steps:

projecting information about a 3D position of the at least one voxel feature in the generated 3D representation into a first camera of the vehicle and into at least one second camera of the vehicle, ascertaining a deviation between the first camera and the second camera, wherein the deviation specifies whether the first and second cameras see a same corresponding image point from the first image data for the projected and at least one voxel feature; and adjusting at least one parameter of the ML model to minimize the ascertained deviation and thus improve the generated 3D representation.

7. One or more computers with a non-transitory machine-readable data carrier on which is stored a computer program including machine-readable instructions for generating a generic three-dimensional (3D) 3D representation of a surroundings of a vehicle, the instructions, when executed by the one or more computers, causing the one or more computers to perform the following steps:

generating first image data, which represent the surroundings of the vehicle, based on at least one data source;

extracting at least one image feature from the first image data using a trainable machine learning (ML) model;

generating a voxel-based 3D representation for the surroundings of the vehicle using the trainable ML model in that the at least one image feature in a two-dimensional (2D) domain is transformed into a corresponding voxel feature in a 3D domain, wherein the generated 3D representation for the at least one voxel feature stores information about a probability with which the 3D domain of the voxel feature is occupied; and training the ML model to extract at least one image feature from at least one camera and to determine an occupancy of all 3D voxels using the following steps:

projecting information about a 3D position of the at least one voxel feature in the generated 3D representation into a first camera of the vehicle and into at least one second camera of the vehicle, ascertaining a deviation between the first camera and the second camera, wherein the deviation specifies whether the first and second cameras see a same corresponding image point from the first image data for the projected and at least one voxel feature; and adjusting at least one parameter of the ML model to minimize the ascertained deviation and thus improve the generated 3D representation.

* * * * *